June 13, 1933. I. NACHUMSOHN 1,913,506
SYNCHRONOUS MOTOR
Filed May 5, 1930
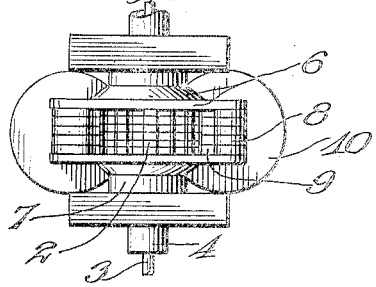
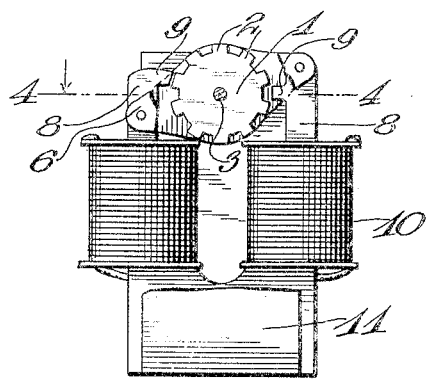
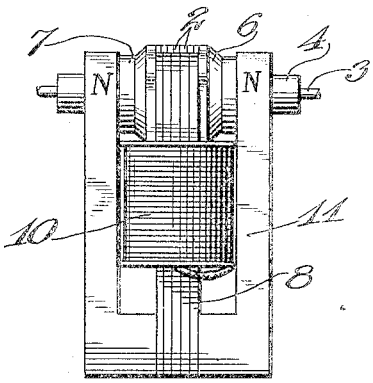
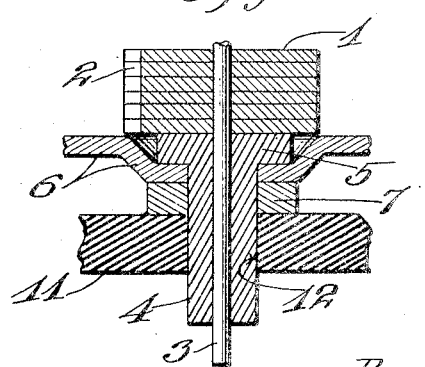
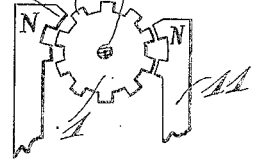

Patented June 13, 1933

1,913,506

UNITED STATES PATENT OFFICE

IRVING NACHUMSOHN, OF CHICAGO, ILLINOIS

SYNCHRONOUS MOTOR

Application filed May 5, 1930. Serial No. 449,922.

This invention relates to electric motors, and more particularly to self-starting synchronous motors.

One object of the invention is to produce a motor of the type described which runs in absolute synchronism with a source of alternating current.

A further object is to provide a synchronous motor which is by its own property self-starting, obviating the necessity of squirrel-cage rotors, shading coils or starting windings of any sort to initiate the operation of the rotor.

A still further object is to provide a synchronous motor in which the running or operating windings also exert the starting torque.

A still further object is to provide a synchronous motor which is capable of operating at speeds which are slow relative to the frequency of the current.

A still further object is to provide a synchronous motor in which the rotor is magnetically polarized by means of relatively stationary magnets.

A still further object is to provide a synchronous motor in which the rotor teeth are all magnetized with the same polarity.

With the above objects in view and any others that may suggest themselves in the specification and claims to follow, a better understanding of the invention may be had by reference to the accompanying drawing, in which—

Figure 1 is a plan view of the novel motor;

Fig. 2 is a side elevation, frontally broken away, showing a single-tooth form of stator pole construction;

Fig. 3 is an end view of the motor;

Fig. 4 is a fragmentary section as viewed along line 4—4 of Figure 2; and

Fig. 5 is a detail showing a multiple-tooth stator construction as a modification.

Referring specifically to the drawing, 1 denotes the rotor of the novel motor, the same having a plurality of teeth 2 built up of several iron laminations held rigidly together by means of a shaft 3 with which the latter rotate. Said shaft is preferably made of a non-ferrous material such as brass or bronze for reasons hereinafter explained.

The shaft 3 extends transversely through the rotor and is rotatably supported in steel or other ferrous bearing members 4, which constitute the upper pole pieces of the permanent magnets. The innermost ends of the members 4 are provided with enlarged head portions 5 constituting the pole faces and, these being disposed adjacent to and on opposite sides of the rotor. The pole-faces 5, Fig. 4, because of their enlarged area, present a path to the rotor of low magnetic reluctance notwithstanding any air gap that may be included between said pole faces and the end laminations. The portions 5 also serve to retain the members 4 in bearing housings 6, which comprise cup-shaped supports made of non-magnetic material such as brass. The bearing members are held against movement relative to their supporting members 6 by means of collars 7 of steel or other ferrous material.

A U-shaped stator comprises a stack of laminations 8 the upper portions of which terminate in one or more series of alined teeth 9. With the rotor between the toothed portions of the stator as shown, the relation between the opposed stator teeth and the rotor teeth is such that the teeth on one leg of the stator are rotatively advanced with respect to the teeth on the opposite leg of the stator. Also the contiguous stator and rotor teeth faces are of equal width, and the advance of the teeth of one stator leg over those of the other is commensurate with a half-pitch difference of the corresponding rotor sides.

Each leg of the stator core is provided with a coil 10. These coils are wound and connected such that their magnetic fields become additive in inducing a flux into the core.

With particular reference to Figures 1 and 3 a pair of L-shaped permanent magnets 11 are grouped in U-formation and with the stator interposed at right-angles; and the magnets are provided with holes 12 (see Fig. 4) in the upper portions thereof through which the bearing members 4 extend. The lower horizontal portions of the magnets 11 are disposed in magnetic contact with the lower portions of the laminations 8. The permanent magnets 11 are magnetized alike. For example, the lower horizontal portions of said magnets form the respective north poles whereas their upper portions, which surround the members 4, form the respective south poles; or, the polarization may be vice versa. In this manner both magnets 11, through the medium of their respective bearings and pole-pieces, serve to magnetize the entire rotor permanently with one polarity. Since the lower poles of the magnets 11 are serially in the magnetic circuit of the stator core said poles normally serve to magnetize the stator teeth equal and opposite to the rotor teeth.

For the operation of the novel motor a supply of alternating current to the coils 10 secures the following action. During one-half of the alternating current cycle one stator leg is magnetized by the windings, causing the teeth thereof to attract the adjacent rotor teeth which are magnetically opposite; and, at the same time the opposite stator teeth are magnetized to the same polarity as that of the rotor and will therefore cause a repulsion between the latter and the rotor teeth adjacent thereto.

In the operation of the motor, the alternating current supplied to the coils 10 generally acts to magnetize the stator so that the teeth of a give core leg thereof, containing a polarity opposite to the rotor teeth as previously described attract such teeth; while the opposite polarity of the other core leg being the same as that of the rotor, the corresponding teeth magnetically repel one another, those two manifestations propelling the rotor in the corresponding direction of rotation. With the current occurring in alternations, this action reverses itself during successive alternations, producing uni-directional rotation of the rotor.

The rotor is made sufficiently light in weight so that the inertia thereof will permit the first magnetic impulse to rotate the rotor to the proper position to receive the second impulse. Yet, the rotor must not be so light as against the force of each impulse that it will accelerate too rapidly, and bring the affected rotor teeth in registration with the corresponding stator teeth before the next impulse occurs, since the given impulse still exerts its magnetic influence and may have a jerking effect on the rotor. This may produce oscillatory rather than unidirectional motion of the rotor; also, it may result in an intermittent rather than uniform motion of the same. On the other hand, if the rotating element is too heavy with respect to the interaction of the impulses, its inertia will not permit it—especially at the start—to move fast enough to assume or remain in synchronism with the driving impulses. For purposes of simplicity I have illustrated the rotating element as the rotor itself, in the make-up of which the proper values are imparted. However, where it would be expedient, the proper value of the rotor may be provided by extending the shaft thereof to carry a flywheel or other unit consistent with the proper requirements of the rotating element.

It will be manifest that during the first cycle there will be an impulse which will impel the rotor in one direction or the other, and due to the absence of excessive inertia associated with the rotating element the latter will immediately get into step with the alternating flux during said first cycle. Yet, the inertia will be sufficient to maintain rotation in such a direction as determined by the magnetic relation between the rotor and stator and the polarity of the initial impulse. Therefore, the motor starts without a rotating magnetic field, special starting windings and the like, as in the present motor the running winding is used as the starting winding and vice versa.

Referring in particular to Figure 2, it will be noted that the lines of force from the lower (for example, south) poles of the permanent magnets will travel differentially into and through the laminated stator legs, re-uniting through the medium of the rotor, and branching to the opposite (for example, north) poles of the permanent magnets to complete the magnetic circuit. This differential magnetic circuit minimizes the tendency of the alternating flux to de-magnetize the permanent magnets, since at an instant where one stator leg magnetically opposes the flux of the permanent magnets, the effect is compensated by the other stator leg acting oppositely upon the influence of the permanent magnets.

Since one complete current cycle causes the advance of a single rotor tooth, it will be understood that for a 60-cycle commercial current supply a rotor of ten teeth will produce six revolutions per second. Therefore a motor so designed would run synchronously at 360 revolutions per minute, which is a comparativey slow speed and makes the novel motor particularly useful for synchronously timed devices, such as electric clocks.

Relative to the motor shaft, it is preferably of non-ferrous material because its stationary supporting members 4, being magnetically polarized, would cause a ferrous shaft to suffer some magnetic adherence or friction.

I claim—

1. In a synchronous motor, a toothed rotor therefor, and a stationary permanent magnet having a polar element uniformly spaced from the plane of rotation of the rotor for polarizing said rotor.

2. A self-starting synchronous motor comprising a toothed rotor and a stator, means forming magnetic circuits for unidirectional and alternating magnetic fluxes, including a bearing member for polarizing said rotor teeth, the interaction between said fluxes forming the sole starting torque for said motor.

3. A self-starting synchronous motor comprising a toothed rotor and a stator, means forming magnetic circuits for unidirectional and alternating magnetic fluxes, including a member positioned axially to the rotor to polarize the rotor teeth, the interaction between said fluxes forming the sole starting torque for said motor.

4. In a self-starting synchronous motor, the combination of a toothed rotor, a toothed stator having some of its teeth advanced rotatively with respect to the rotor relative to the other teeth thereof, a winding adapted to be connected to a source of current for energizing said stator, and a permanent magnet having a polar element presented in an axial direction to said rotor for polarizing the rotor.

5. In a self-starting synchronous motor, the combination of a toothed rotor, a toothed stator having some of its teeth advanced rotatively with respect to the rotor relative to the other teeth thereof, a winding adapted to be connected to a source of current for energizing said stator, and a permanent magnet having one of its poles arranged to impart a given polarity to such stator and having another polar element of opposite polarity presented in an axial direction to the rotor for imparting said opposite polarity to said rotor.

In testimony whereof I affix my signature.

IRVING NACHUMSOHN.